March 24, 1925.
J. H. RAND
INDEX FRAME
Filed Jan. 7, 1924    2 Sheets-Sheet 2
1,530,618
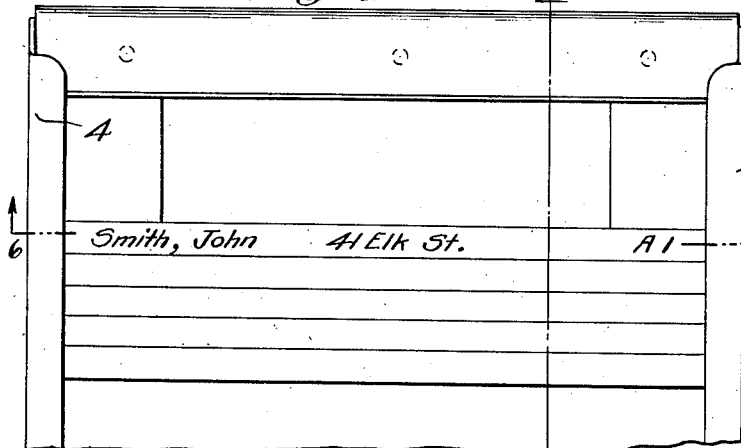
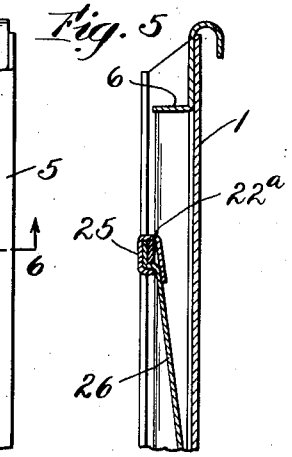
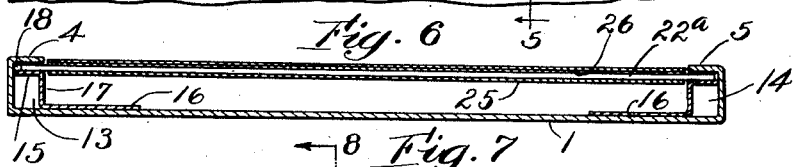
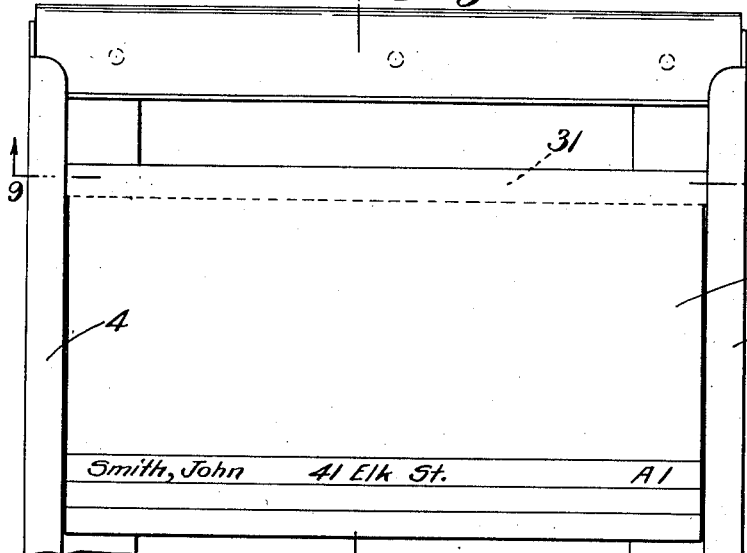
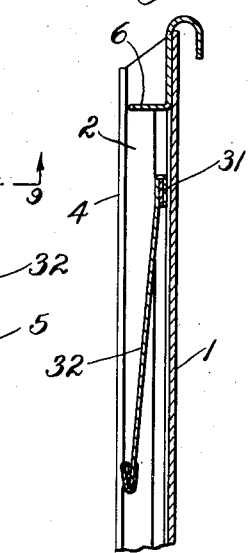
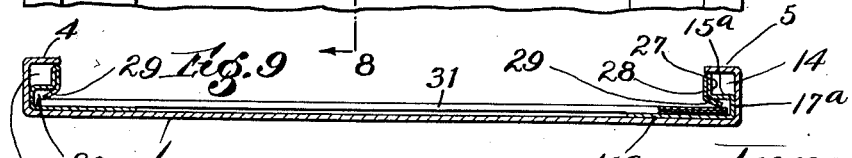
Inventor:
James H. Rand
by Roberts, Roberts & Cushman
attys.

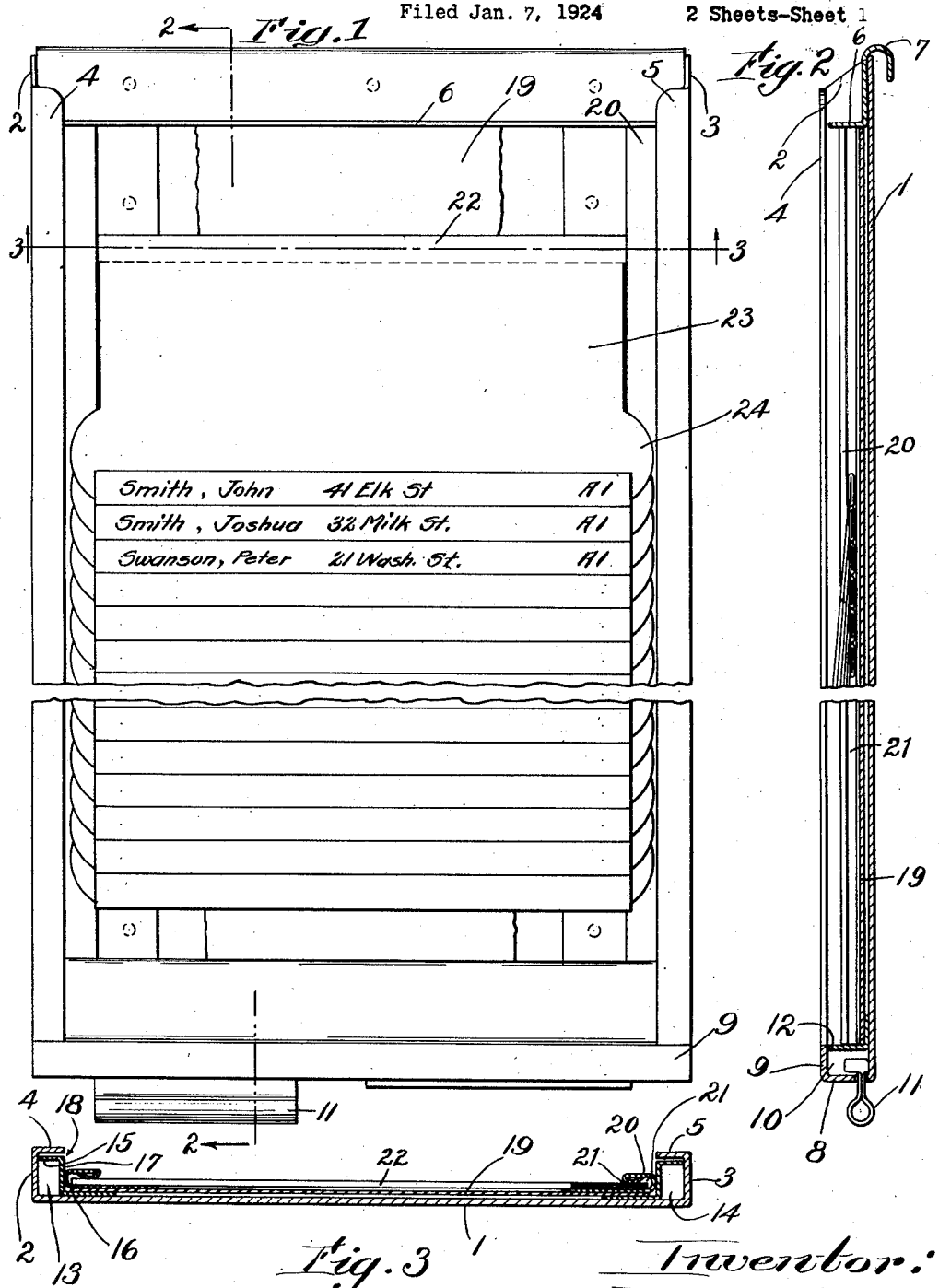
March 24, 1925.
J. H. RAND
INDEX FRAME
Filed Jan. 7, 1924    2 Sheets-Sheet 1
1,530,618
Inventor:
James H. Rand
by Roberts Roberts Cushman
Attys.

Patented Mar. 24, 1925.

1,530,618

UNITED STATES PATENT OFFICE.

JAMES H. RAND, OF NORTH TONAWANDA, NEW YORK.

INDEX FRAME.

Application filed January 7, 1924. Serial No. 684,702.

*To all whom it may concern:*

Be it known that I, JAMES H. RAND, a citizen of the United States of America, and resident of North Tonawanda, in the county of Niagara and State of New York, have invented new and useful Improvements in Index Frames, of which the following is a specification.

This invention pertains to indexes of the visible type and consists in the novel features hereinafter described and particularly pointed out in the claims.

In the accompanying drawings certain desirable embodiments of the invention are illustrated by way of example;—

Fig. 1 being a fragmentary plan view of an index device embodying the present improvements;

Fig. 2 is a longitudinal section on the line 2—2 of Fig. 1;

Fig. 3 is a transverse section on the line 3—3 of Fig. 1;

Fig. 4 is a fragmentary plan view of a modified arrangement of the index device.

Fig. 5 is a section on the line 5—5 of Fig. 4;

Fig. 6 is a section on the line 6—6 of Fig. 4;

Fig. 6ª is a similar section illustrating a modified retainer;

Fig. 7 is a fragmentary plan view of a further modified form of index device;

Fig. 8 is a section on the line 8—8 of Fig. 7;

Fig. 9 is a section on the line 9—9 of Fig. 7; and

Fig. 9ª is a similar section illustrating a modified retainer.

Referring to Figs. 1, 2 and 3 the index device comprises a substantially rigid frame preferably formed of sheet material having the back 1 provided with flanges at its lateral margins comprising the forwardly extending walls 2 and 3, and the inwardly directed front members 4 and 5 respectively substantially parallel to the back and spaced from the latter. A transverse wall 6 preferably extends from the wall 2 to the wall 3 adjacent to one end of the frame and if desired this wall may be integral with a supporting hook 7 projecting to the rear at the end of the back. The opposite end of the frame is closed preferably by bending the back 1 to form the forwardly extending flange 8 which is turned inwardly to provide the front member 9. The space just above the member 8 conveniently constitutes a chamber 10 for the reception of an enlargement upon the inner end of a handle 11 having a shank projecting through an opening in the member 8. The chamber 10 is closed at its inner side by a partition 12 secured to the member 1.

The frame thus constructed constitutes a shallow drawer which may conveniently be employed in a filing cabinet of the general type disclosed in my copending application, Serial No. 684,704 filed January 7, 1924, or may be utilized in any other desirable manner, as for example by suspending it from or mounting it upon any suitable support.

The marginal flanges of the frame provide opposed channels 13 and 14 respectively and a retainer or positioner is disposed within each channel. In the preferred form of the invention the retainers are made from strips of sheet material, as for example thin sheet steel, bent to provide the substantially parallel flanges 15 and 16 connected by the web 17, the retainer being of substantially Z-shape in cross section. The retainers are so disposed in the channels that the free edges of the flanges 15 engage the inner surfaces of the walls 2 and 3 respectively while the flanges 16 lie in contact with the back 1 of the frame. The webs 17 are thus disposed substantially perpendicular to the back wall of the frame and are spaced from the side walls 2 and 3 of the frame so that they lie substantially flush with the inner edges of the front members 4 and 5 respectively. The web 17 is of such length that the flange 15 of the retainer is spaced from the front wall of the frame flange to provide a channel 18.

In the preferred arrangement a removable transfer panel is disposed between the webs 17 of the retainers. This panel comprises the back 19 preferably formed of sheet material having forwardly and inwardly directed flanges 20 at its lateral margins. These flanges may be integral with the back 19 of the panel or as illustrated, consist of separate strips of material secured in any desirable manner as for example by spot welding to the back 19. These flanges 20 provide opposed guide ways 21 at the marginal portions of the panel.

The panel supports a series of overlapping index elements each comprising a supporting rail 22 of any desired type. For example this rail may consist of a celluloid sheath having a strip of cardboard disposed within it, the ends of the sheath projecting into the respective guide ways 21. Each rail carries a card 23 preferably provided with oppositely directed ears at its free edge which overlap the front faces of the flanges 20. The index elements supported by the panel are, as is usual in indexes of this type, movable longitudinally of the panel by sliding their rails along the guide ways 21 and may also be swung forwardly to exhibit the data upon their backs or upon the underlying card.

The panel with its series of index elements is frictionally held within the frame by the engagement of its flanged lateral margins with the web members 17 of the opposed retainer devices. As the retainer devices are somewhat resilient the panel is securely held in position within the frame but may be removed therefrom by pulling it forwardly.

In Fig. 4 the same frame and retainer devices are illustrated as directly supporting a series of index elements, the panel being omitted. In this, as in the arrangement previously described, the retainers may be secured in proper position if desired by any suitable means, for example by spot welding them to the back 1. In this case the index elements comprise sheaths 25 of transparent material having cardboard strips 22ª disposed within them, the ends of the strips extending beyond the ends of the sheaths and being disposed within the channels 18 of the frame. These channels, as above described, are defined by the flanges 15 of the retainers and the front members 4 and 5 respectively of the frame flanges. These index elements while of any desired type may comprise the cards 26 whose upper ends are secured within the resilient sheaths 25. The index elements thus arranged may be moved longitudinally of the frame in the usual manner but if they are to be removed from the frame must be taken out separately rather than in a group as may be done when the panel is employed.

In Figs. 7, 8 and 9 a modified form of retainer is illustrated, comprising the parallel flanges 15ª and 16ª united by the web 17ª. The web 17ª is shorter than that in the preceding example and the flange 15ª is bent to provide the auxiliary web 27 which is doubled on itself as shown at 28 and terminates in a tongue 29 which extends diagonally into the channel 30 lying between the flange members 15ª and 16ª.

A series of index elements comprising rails 31 whose ends project into the channels 30 may be employed with this type of retainer. These index elements comprise the cards 32 secured in any desired way to the rails and overlapping each other. This type of retainer is particularly well adapted for index cards which are flexible or hinged to the supporting rail as the tongues 29 may so restrict the channels 30 as to prevent the ends of the rails from sliding freely. While the construction illustrated in Figs. 7, 8 and 9 is adapted for holding index elements directly, it is equally well adapted for holding a removable transfer panel of the type illustrated in Figs. 1, 2 and 3.

The index frame with its retainers in any of its modifications is adapted for alternative use with a removable transfer panel or with individual index elements. Thus, for example when an index is made up of but a few of the frames it may be desirable to mount the index elements individually in the frames. If, on the other hand, the index comprises a large number of such frames, it may frequently be desirable to transfer large groups of index elements from one part of the index to another without disturbing their relative relation and under such circumstances it is very convenient to mount the index elements upon panels which may be transferred bodily from one frame to another, as the occasion may demand.

Figs. 6ª and 9ª illustrate constructions similar to those shown in Figs. 6 and 9 except that the metallic retainers are replaced by a wooden retainer W which may be used in either of the two positions illustrated.

I claim:

1. An index comprising a frame and means operative alternatively to retain a removable panel or a plurality of relatively movable independent index elements within the frame.

2. An index having a frame provided with a channel and a retainer in said channel having members alternatively engageable with a removable index-supporting panel or with an independent index element for positioning said panel or element respectively in the frame.

3. An index comprising a frame having opposed channels, and members cooperating with the respective channels alternatively to retain a removable index-supporting panel or a plurality of independent index elements.

4. An index comprising a frame having opposed channels and a removable positioner extending longitudinally of each channel, said positioner having surfaces respectively engageable with the edges of a removable index-supporting panel or with an individual index element.

5. An index having a frame comprising a back and a marginal flange provided with a front member substantially parallel to the back and spaced from the latter to form a channel, and a retainer disposed within the channel having a surface substantially parallel with the back defining one side of a guide channel for independent index elements and a surface substantially perpendicular to the back of the frame for engagement with a removable index panel.

6. An index having a frame comprising a back and a marginal flange provided with an inwardly extending front member substantially parallel to the back and spaced from the latter to form a channel, and a retainer disposed within the channel having a surface substantially parallel with the back and spaced from the inner surface of the front member of the flange of the frame forming with the latter an elongate guideway for the ends of independent index elements, and a surface substantially perpendicular to the back for engagement with the edges of a removable index-supporting panel.

7. An index comprising a frame having opposed channels, a removable index-supporting panel, and means disposed within the channels constructed and arranged to engage the edges of the panel normally to retain it within the frame.

8. An index having a frame provided with opposed channels, a removable panel having means for supporting a series of independent index elements, and a retainer disposed within each of the channels resiliently engaging the panel and normally holding it in the frame.

9. An index having a frame provided with opposed channels, a panel provided with means for positioning a plurality of index elements, and a retainer within each of the channels for removably securing the panel to the frame.

10. An index having a frame provided with opposed channels, a panel comprising a back and marginal flanges for positioning a series of independent index elements, and a retainer disposed within each of the channels of the frame having a surface frictionally engageable with the edge of the panel removably to hold the latter in the frame.

11. An index comprising a frame having a back and spaced parallel inwardly directed flanges forming opposed channels, and a member seated within each channel having a surface substantially perpendicular to the back of the frame and a surface substantially parallel to but spaced from the inner surface of the front member of the flange.

12. An index comprising a frame having a back, forwardly and inwardly directed flange members at its margins forming opposed channels, and a member disposed in each channel comprising a part engaging the back of the frame, a part having a surface substantially perpendicular to the back and spaced from the edge of the latter, and a part having a surface substantially parallel to the inwardly directed members of the flange.

13. An index having a back provided with a marginal channel-forming flange comprising a forwardly projecting member substantially perpendicular to the back, and an index retainer disposed within the channel of the flange having a surface substantially perpendicular to the back of the frame and spaced from the forwardly projecting member of the flange.

14. An index having a frame provided with a marginal channel-forming flange comprising a forwardly directed member and a front member, and an index retainer within the channel of the flange comprising a strip of sheet material bent to provide a member substantially parallel to the forwardly projecting member of the flange and spaced from the latter to lie substantially flush with the free edge of the front member of the flange.

15. An index comprising a frame provided with a marginal channel, and a retainer disposed within the channel, the retainer comprising a pair of substantially parallel flanges united by a web, one of the flanges being disposed in contact with the rear wall of the channel and the opposite flange being spaced from the front wall of the channel.

16. An index comprising a frame provided with a marginal channel, and a retainer disposed within the channel, the retainer comprising a pair of substantially parallel flanges united by a web substantially normal thereto, said web being of less width than the front to rear depth of the channel.

17. An index comprising a shallow drawer-like frame having side walls provided with inwardly directed members at their edges defining marginal channels, and a retainer disposed in each channel consisting of a strip of sheet material bent to provide substantially parallel flanges united by a web, the web being substantially parallel to and spaced from the side wall of the frame.

18. An index comprising a frame having opposed guide channels, a retainer disposed in each channel, a panel having marginal inwardly directed flanges providing parallel guideways, and a series of independent index elements comprising rails, the opposite ends of the rails being disposed in the respective guide ways, the flanged edges of the panel engaging the retainers to position the panel relatively to the frame.

19. An index comprising a frame having forwardly directed marginal flanges providing opposed guide channels, a retainer disposed in each channel, a removable panel comprising a piece of sheet material having marginal inturned flanges defining parallel guide ways, the panel being disposed between the flanges of the frame with its flanged edges frictionally engaging the respective retainers, and a series of index elements each having a rail projecting at its opposite ends into the guide ways of the panel, and a pair of laterally projecting ears overlapping the front faces of the flanges of the panel.

Signed by me at Boston, Massachusetts, this 18th day of December 1923.

JAMES H. RAND.